…

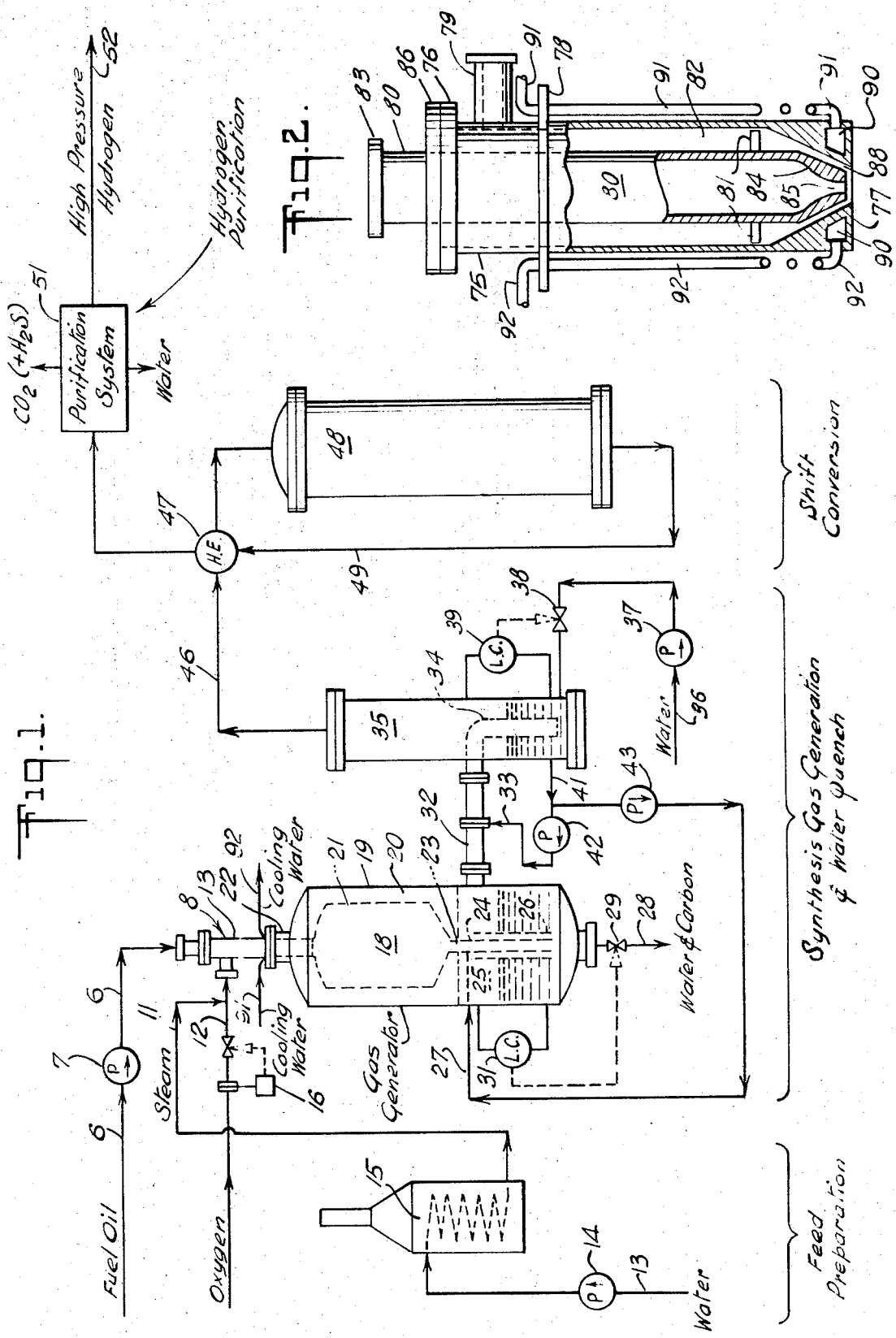

United States Patent Office 3,545,926
Patented Dec. 8, 1970

3,545,926
PRODUCTION OF SYNTHESIS GAS AND HYDROGEN
Warren G. Schlinger, Pasadena, and William L. Slater and Roger M. Dille, La Habra, Calif., assignors to Texaco Inc., New York, N.Y., a corporation of Delaware
Continuation-in-part of application Ser. No. 510,038, Nov. 26, 1965, which is a continuation-in-part of application Ser. No. 285,868, June 6, 1963. This application May 29, 1968, Ser. No. 732,941
Int. Cl. C01b 1/28, 2/16
U.S. Cl. 23—213                               5 Claims

ABSTRACT OF THE DISCLOSURE

Improved process for generation of hydrogen from liquid hydrocarbons at very high pressures, i.e. pressures in the range of 1000 to 3000 p.s.i.g. by partial oxidation followed by water gas shift reaction and carbon dioxide removal at pressures above 1000 p.s.i.g.

---

This application is a continuation-in-part of our copending U.S. patent application, Ser. No. 510,038, filed Nov. 26, 1965, now abandoned, which, in turn, is a continuation in part of our application, Ser. No. 285,868, filed June 6, 1963, and now abandoned.

This invention relates to a process for the production of hydrogen at highly elevated presures, e.g. at pressures in the range of 1000 to 3000 p.s.i.g., preferably in the range of 1200 to 2500 p.s.i.g. In one of its more specific aspects, the present invention involves reacting a hydrocarbon oil with oxygen and steam at a pressure above 1000 p.s.i.g. with the production of carbon monoxide and hydrogen as principal products of reaction, thereafter subjecting products of said partial oxidation reaction to catalytic reaction with steam effecting the water gas shift reaction at said elevated pressure above 1000 p.s.i.g. effecting substantially complete conversion of carbon monoxide to carbon dioxide with simultaneous production of hydrogen, and thereafter removing carbon dioxide at said elevated pressure to yield a hydrogen-rich product at a pressure above 1000 p.s.i.g.

Direct partial oxidation of hydrocarbons to carbon monoxide and hydrogen by noncatalytic reaction with oxygen or air, optionally in the presence of steam, is known. Liquid hydrocarbons, especially heavy fuel oils, are economically attractive fuels for the process. Although partial oxidation of hydrocarbons at pressures as high as 1000 p.s.i.g. has been proposed heretofore, operation of the water gas shift reaction has heretofore been limited to reaction pressures in the range of atmospheric pressure to 400 p.s.i.g.

In our method of production of hydrogen by direct partial oxidation of liquid hydrocarbons at high pressures above 1000 p.s.i.g., the water gas shift reaction is carried out at a pressure substantially equivalent to that of the partial oxidation reactor. Unexpectedly, improved results are obtained when the water gas shift is carried out at pressures in the range of 1000–2500 p.s.i.g. in accordance with this invention.

Generation of synthesis gas is carried out at a pressure ing the range of 1000 to 2500 p.s.i.g. with steam supplied to the reaction zone in relative proportions within the range of one pound of steam to one to ten pounds of hydrocarbon oil, preferably in the range of one pound of steam to 1½ to five pounds of hydrocarbon oil, and substantially pure oxygen, i.e. oxygen of at least 95 volume percent purity, supplied to the gas generation reaction zone in an amount within the range of 10.4 to 14.4 standard cubic feet of oxygen per pound of oil. Relative proportions of oil, steam and oxygen within the indicated ranges are regulated to ensure an autogeneous temperature in the gas generation zone within the range of 1800 to 2800° F.

Effluent gas from the reaction zone containing carbon monoxide, hydrogen, water vapor, and minor amounts of impurities, is cooled, ssbstantially at reaction zone pressure, either by direct contact with water in a gas-liquid contacting zone, or by indirect heat exchange. Direct cooling is generally preferred, using water preheated to equilibrium temperature of the gas-liquid contacting zone and supplied to the contacting zone in an amount in excess of the amount which can be vaporized by the heat contained in the effluent gas from the gas generation reaction zone. The effluent gas stream, cooled to a temperature in the range of 500 to 600° F. and comprising carbon monoxide, hydrogen, and steam, is passed at substantially reaction zone pressure to a water gas shift reaction zone. The water gas shift reaction zone contains a catalyst effective for reaction of steam with carbon monoxide to produce carbon dioxide and hydrogen. Effluent gas from the water gas shift reaction zone is processed without reduction in pressure for removal of carbon dioxide to yield a hydrogen-rich stream which is available at a pressure in the range of 1000 to 3000 p.s.i.g. for utilization in subsquent reaction systems such as hydrogenation or ammonia synthesis.

A preferred embodiment of the process of this invention is illustrated in the accompanying drawings.

FIG. 1 is a diagrammatic elevational view of apparatus for carrying out the method of this invention.

FIG. 2 is a cross-sectional view of a burner structure suitable for generation of synthesis gas at high pressure.

With reference to FIG. 1 of the drawings, hydrocarbon liquid, for example, fuel oil from a suitable source, is supplied through line 6 and delivered at required pressure and a predetermined rate by a pump 7 to a mixer-burner 8 forming a part of a synthesis gas generator. A preferred embodiment of burner 8 is illustrated in FIG. 2 described in more detail hereinafter. Steam and oxygen are supplied from suitable sources through lines 11 and 12, respectively, mixed with one another and introduced to burner 8. In a preferred embodiment illustrated, water from a suitable source of supply is delivered through line 13 at the required pressure and at a predetermined rate by pump 14 to a heater 15 where it is converted into steam and supplied to burner 8 through line 11. Pumps 7 and 14 ensure accurate proportioning of the steam and oil supplied to the gas generator. Oxygen supply to the gas generator is suitably controlled by a rate of flow controller 16. A mixture of oxygen and steam from lines 11 and 12 and oil from line 6 is formed by the mixture-burner 8 and supplied directly to synthesis gas generation zone 18.

Gas generator 18 comprises a cylindrical pressure vessel 19 with a refractory lining 20 defining a cylindrical compact, unpacked reaction chamber 18. The reaction mixture from burner 8 is injected axially into the upper end of reaction chamber 18 through a suitable inlet passageway 22. Products of reaction are discharged axially from the lower end of reaction zone 18 through an outlet passageway 23.

In gas generator 18, immediate and substantially complete reaction takes place between the hydrocarbon and oxygen at reaction zone temperatures in the range of 1800° F. to 3000° F. forming carbon monoxide and hydrogen as principal products of reaction. Steam moderates the reaction temperature to prevent excessive generator temperatures and, at the same time, some of the steam reacts with carbon or hydrocarbons to form carbon monoxide and hydrogen and with carbon monoxide to form carbon dioxide and hydrogen.

The relative proportions of oil, steam and oxygen are carefully regulated to convert substantially all of the carbon in the hydrocarbon oil to carbon monoxide and maintain an autogenous reaction zone temperature in the range of 1800° F. to 3000° F., preferably 2000° to 2800° F. as described in more detail hereinafter. Small amounts of free carbon, e.g. 1 to 5 percent of the carbon in the oil feedstream from line 6 appears in the product gas leaving reaction zone 18. Also, small amounts of carbon dioxide, e.g. 5 to 7 mol percent of the product gas, dry basis, appear in the gas generator product probably as a result of the water gas shift reaction. From 90 to 92 percent of the carbon in the hydrocarbon feed stream is converted directly to carbon monoxide.

A small amount of methane, e.g. 0.01 to 2 mol percent, is usually present in the product gas. Some nitrogen and argon may be included in the product gas, depending upon the purity of the oxygen supplied to the process.

We have discovered that the hot gas from the synthesis gas generator may be cooled by direct contact with water at the pressure of the synthesis gas generator and passed directly to the shift converter. Sufficient water is vaporized into the hot synthesis gas to supply all of the excess steam required for the shift conversion reaction.

Hot product gases leaving the generator through outlet 23 are passed through conduit 24 into a quench section 25 in the lower part of vessel 19. Conduit 24 is surrounded by a larger conduit 26 spaced from conduit 24 and open at both ends to chamber 25. Quench chamber 25 normally contains a quantity of water into which hot gases from conduit 24 are introduced for quench cooling the product gases from gas generator 18. Water from a suitable source is introduced directly into conduit 24 through line 27. A preferred source of cooling water is described hereinafter. Suitable apparatus for quench cooling hot synthesis gas is described in detail in U.S. Pat. 2,818,326. Water is drawn from the quench chamber 25, as required, through line 28 controlled by valve 29 in response to a liquid level controller 31 to maintain the desired level of quench water in the quench chamber 25.

Cooled product gas is discharged from quench zone 25 through transfer line 32, into which water is injected from line 33 from a source described hereinafter. Intimate contact between cooled product gas in line 32 and water from line 33 is effected by a suitable contacting device, not illustrated, such as an orifice contactor or a venturi contactor in which the gas stream is accelerated and water injected into the high velocity stream at the throat of the orifice or venturi; such contactors are known in the art. The resulting mixture of gas and water is introduced through dip leg 34 into a contactor-separator vessel 35 where water is separated from the gas stream. Water is introduced into separator 35 from a suitable source of supply through line 36 by pump 37 as controlled by valve 38 in response to a liquid level controller 39 which maintains a substantially constant quantity of water in the lower part of separator 35. Water is continuously withdrawn from the lower part of separator 35 through line 41; part of this water is supplied to line 33 by pump 42, while the remainder is supplied to conduit 24 in quench zone 25 via line 27 by pump 43.

In quench zone 25, hot gas from the generator 18 is quickly cooled in an equilibrium temperature, within the range of 500 to 600° F. by vaporization of water. At the same time, carbon contained in the product gas is removed therefrom forming a slurry of carbon in water which is withdrawn from the quench chamber through line 28. Additional contacting of the gas with water in transfer line 32 and in the lower part of contactor-separator 35 insures substantially complete removal of carbon from the gas stream. Steam generated by vaporization of water in the contacting steps supplies steam necessary for subsequent water gas shift reaction, which converts carbon monoxide to carbon dioxide and hydrogen.

Clean product gas from the synthesis gas generator is discharged from separator 35 through line 46 and heat exchanger 47 to a shift converter 48 containing a suitable shift conversion catalyst, e.g. iron oxide containing 5 to 15 weight percent chromic oxide as promoter. The net results of reactions taking place in shift converter 48 are slightly exothermic. The shift converter operates at temperatures in the range of 550 to 1000° F., preferably 600 to 950° F. and at substantially the same pressure as gas generator 18, i.e. at a pressure in the range of 1000 to 3000 p.s.i.g. Shifted synthesis gas, consisting essentially of carbon dioxide and hydrogen, is discharged from shift converter 48 through line 49 and passed to heat exchanger 47 to preheat gas from separator 35 to the desired shift reaction temperature.

From heat exchanger 47, the shifted synthesis gas is passed to a suitable purification system 51 for removal of water and carbon dioxide (and hydrogen sulfide if present). Hydrogen at high pressure, i.e. 1000 to 3000 p.s.i.g., is discharged through line 52.

A number of shift converter catalysts are available commercially. Oxides and sulfides of iron, nickel, cobalt, molybdenum, zinc, copper and chromium are used in various catalysts some of which employ various combinations of these materials. Preferred catalysts are those with iron oxide or iron sulfide as the major catalytic component with minor amounts of the oxides and sulfides of nickel, zinc and chromium.

For the production of hydrogen or mixtures of hydrogen and nitrogen suitable for the synthesis of ammonia, the product gas from the partial oxidation reaction is cooled, treated for removal of carbon, subjected to the water gas shift reaction, and purified by removal of carbon dioxide, water vapor or steam, hydrocarbons, argon, etc., to yield pure hydrogen or a mixture of hydrogen and nitrogen substantially free from other constituents. In the water gas shift reaction, gas from the synthesis gas generator, mixed with steam, is passed over a catalyst to effect reaction between carbon monoxide and steam to produce hydrogen and carbon dioxide. For the synthesis of ammonia, pure nitrogen obtained by liquefaction and rectification of air usually is added to the purified stream of hydrogen.

One method of removing most of the minor impurities from hydrogen, following removal of carbon dioxide and water, is by washing the hydrogen stream with substantially pure liquid nitrogen. Substantially pure nitrogen can be produced in the oxygen plant. Some of the liquid nitrogen is vaporized into the hydrogen to form the nitrogen-hydrogen mixture required for ammonia synthesis. At the same time, higher boiling constituents, e.g. argon, methane and carbon monoxide are condensed and withdrawn with the unvaporized portion of the liquid nitrogen wash. Washing the hydrogen stream with liquid nitrogen produces a mixture of nitrogen and hydrogen, substantially free from other gases, especially advantageous for ammonia synthesis. The nitrogen wash is particularly suitable for use in the generation of ammonia synthesis feed gas by partial oxidation of hydrocarbons.

With reference to FIG. 2, a mixer-burner structure suitable for use as burner 8 of FIG. 1 for carrying out the method of this invention is shown in detail. This burner structure comprises a cylindrical steel conduit 75 provided with a flange 76 at one end and a water-cooled tip structure 77 at the other end. A mounting flange 78 intermediate the two ends of the cylindrical shell is provided for attachment of the burner to vessel 19 of FIG. 1. A flanged nozzle 79, intermediate flanges 76 and 78, provides an inlet for reactants to conduit 75.

A second tubular conduit 80 is contained within the outer conduit 75 and is uniformly spaced therefrom by guide spacers 81 to provide a uniform, annular passageway 82 between the two conduits. Inner conduit 80 has a flange 83 at one end, and a tip section 84 at the other having an axial outlet port or orifice 85. A mounting flange 86 intermediate the two ends of inner conduit 80 cooperates with flange 76 of outer conduit 75 to hold the conduits in fixed relation to one another. Suitably, the area of the outlet port 84 is one fourth to one half the free cross-sectional area of conduit 80. Tip portion 84 of conduit 80 is also tapered externally to provide a substantially uniform passageway or outer discharge port 86 between the outer surface of tip 83 and the inner surface of tip 77 for discharge of gaseous reactants from annular passageway 82. Conduits 75 and 80, comprising the basic elements of the burner, are axially aligned with one another and with the reaction chamber 18 for fast, uniform mixing of reactants and uniform reaction within the reaction chamber.

The burner tip structure 77 contains a passage 90 surrounding outer discharge port 88 for cooling the burner tip with cooling water which is supplied to passage 90 through line 91. Water from line 91 circulates around the burner tip through passage 90 and is discharged through conduit 92.

In operation, liquid hydrocarbon from line 6 is supplied through the interior of conduit 80 to tip 84 and discharged into reaction zone 18 through outlet port 85. At the same time, steam and oxygen from lines 11 and 12 are introduced through inlet 70 to annular passageway 82 and discharged through annular port 88 at high velocity relative to the velocity of the stream of oil discharged from port 85. The converging annular stream of gaseous reactants discharged from port 88 impinges upon the stream of liquid discharged through port 85 at high velocity with the result that the liquid hydrocarbon is intimately dispersed in the gaseous reactants and forms a homogeneous reaction mixture substantially at the point of discharge of reactants from the burner into the reaction chamber 18. The mixture of reactants undergoes immediate reaction at reaction zone temperatures of 1800 to 3000° F. with the liberation of sufficient heat to maintain an autogenous temperature in the reaction zone in the range of 1800 to 3000° F.

A converging annular stream of oxygen and steam is discharged at relatively high velocity, for example a velocity above about 200 feet per second, suitably in the range of 200 to 400 feet per second, axially into reaction zone 18. Oil supplied to the burner through line 6 is discharged centrally and axially into the converging mixture of steam and oxygen. Convergence and impingement of the streams into one another results in an intimate mixture of oxygen, steam and highly dispersed droplets of hydrocarbon liquid. The velocity of the oil stream at the point of discharge into the stream of oxygen and steam is preferably in the range of 5 to 40 feet per second. The relatively high velocity differential between the gaseous stream, i.e. the mixture of steam and oxygen, and the liquid hydrocarbons stream results in efficient and highly effective atomization of the hydrocarbon liquid.

Preheating of the oil is not necessary, but oil preheat is generally desirable to reduce the viscosity of the oil and to conserve oxygen. Steam and oxygen may be preheated if desired or may be supplied at temperatures just sufficient to maintain the steam in vapor phase, for example, temperatures in the range of 400 to 1000° F.

Exceptionally high throughputs are possible with the very high pressure generator. Whereas, usual high pressure operations produce dry gas product yields of about 6,000 to 13,000 standard cubic feet of gas per hour per cubic foot of generator reaction space, product gas rates above 20,000 standard cubic feet per cubic foot of reactor volume may be attained at generator pressures above 1000 p.s.i.g.

The following examples show calculated comparative data based on a large number of runs for the generation of synthesis gas by partial oxidation of hydrocarbon oil at conventional high pressure and at very high pressure. In each of the examples, the product gas from the synthesis gas generator is quench cooled by direct contact with water at the pressure of the synthesis gas generator and the analysis reported on a dry basis.

EXAMPLES

Synthesis gas is generated in an unpacked reactor by partial oxidation of hydrocarbon fuel by non-catalytic reaction with oxygen and steam at various pressures and under the operating conditions indicated in the following table. The internal volume of the reactor in each instance is 1.85 cubic feet. Pure oxygen is mixed with steam and the mixture supplied to the gas generator at 500° F. The fuel oil in each instance is preheated to 250° F.

Hot synthesis gas from the generator in each of the examples is contacted in a closed quench zone at generator pressure with water preheated to the prevailing temperature of the quench zone. After removal of carbon from the unvaporized part of the quench water, it is recycled to the quench system. The steam-enriched product gas from the quench system is passed to a shift converter containing iron oxide catalyst comprising ferric oxide promoted with chromic oxide. The shift converter is operated at substantially the same pressure as the synthesis gas generator and the quench system.

The fuel oil supplied to the synthesis gas generator has the following characteristics.

| | |
|---|---|
| Gravity, °API | 9.70 |
| Ultimate analysis, wt. percent | |
| Carbon | 87.76 |
| Hydrogen | 9.97 |
| Sulfur | 1.30 |
| Nitrogen | 0.97 |
| Heating value, B.t.u.'s/lb. | 18,335 |

| Example No. | 1 | 2 | 3 | 4 | 5 |
|---|---|---|---|---|---|
| Operating conditions: | | | | | |
| Pressure, p.s.i.g | 300 | 600 | 1,200 | 1,800 | 2,400 |
| Temperature, °F | 2,739 | 2,313 | 2,486 | 2,470 | 2,377 |
| Residence time, secs | 1.21 | 3.27 | 2.60 | 2.95 | 3.32 |
| Feed rates: | | | | | |
| Oxygen, s.c.f.h | 4,555 | 5,797 | 8,465 | 11,181 | 13,402 |
| Oils, lbs./hr | 337.41 | 442.55 | 661.34 | 879.75 | 1,085.2 |
| Steam, lbs./hr | 168.7 | 221.27 | 330.67 | 439.88 | 542.6 |
| Steam/oil, lb./lb | 0.5 | 0.5 | 0.5 | 0.5 | 0.5 |
| Oxygen/oil, s.c.f./lb | 13.5 | 13.1 | 12.8 | 12.71 | 12.35 |
| Oxygen/oil, moles/MM B.t.u. | 1.94 | 1.88 | 1.84 | 1.83 | 1.77 |
| Product rates: | | | | | |
| Dry gas, moles/hr | 43.54 | 57.95 | 87.21 | 115.71 | 142.45 |
| Dry gas, s.c.f.h | 16,523 | 21,992 | 33,095 | 43,911 | 54,059 |
| Carbon, wt. percent of C in feed | 2.0 | 2.0 | 2.0 | 2.0 | 2.0 |
| Product gas composition (Dry, mol percent): | | | | | |
| Hydrogen | 43.94 | 44.76 | 45.14 | 45.00 | 44.89 |
| Carbon monoxide | 49.86 | 49.22 | 48.65 | 48.57 | 48.22 |
| Carbon dioxide | 5.60 | 5.42 | 5.43 | 5.44 | 5.37 |
| Nitrogen | 0.27 | 0.26 | 0.26 | 0.26 | 0.26 |
| Methane | 0.01 | 0.03 | 0.21 | 0.42 | 0.95 |
| Hydrogen sulfide | 0.30 | 0.29 | 0.29 | 0.29 | 0.29 |
| Carbonyl sulfide | 0.02 | 0.02 | 0.02 | 0.02 | 0.02 |
| $O_2/H_2+CO$ (s.c.f./m.s.c.f.) | 293.9 | 280.52 | 272.70 | 272.17 | 266.27 |
| Quench system: | | | | | |
| Temperature, °F | 376 | 436 | 509 | 559 | 597 |
| Steam/dry gas, mols/mol | 1.65 | 1.58 | 1.61 | 1.67 | 1.68 |
| Shift converter: | | | | | |
| Bed No. 1: | | | | | |
| Inlet temp., °F | 700 | 700 | 700 | 700 | 700 |
| Outlet temp., °F | 950 | 950 | 941 | 908 | 880 |
| Bed No. 2: | | | | | |
| Inlet temp., °F | 761 | 761 | 783 | 786 | 782 |
| Outlet temp., °F | 826 | 812 | 805 | 801 | 792 |
| Overall space velocity, s.c.f.h./cu. ft. catalyst | 301 | 557 | 838 | 1,010 | 1,097 |
| Conversion of CO, mol percent | 90 | 90 | 90 | 90 | 90 |

We claim:

1. In a process for the production of hydrogen wherein hydrocarbon liquid is subjected to partial oxidation by reaction with oxygen and steam at an autogenous reaction temperature within the range of 1800 to 3000° F. in a compact reaction zone free from packing, the improvement which comprises carrying out said partial oxidation reaction at a pressure in the range of 1000 to 3000 p.s.i.g., introducing the reactants at a rate sufficient to generate a mixture of carbon monoxide and hydrogen at a rate in excess of 15,000 standard cubic feet of mixture per hour per cubic foot of volume of said compact reaction zone, generating sufficient steam for substantially complete conversion of carbon monoxide to carbon dioxide in a subsequent water gas shift by passing effluent gas from said reaction zone at said reaction temperature into direct contact with water at equilibrium vaporization temperature in a gas quench zone maintained at substantially reaction zone pressure, passing effluent gas from said gas quench zone into a water gas shift reaction zone maintained at a pressure within the range of 1000 to 3000 p.s.i.g. and substantially equal to the pressure of said first reaction zone effecting substantially complete conversion of carbon monoxide to carbon dioxide with concomitant production of hydrogen, discharging effluent of said water gas shift reaction zone comprising hydrogen and carbon dioxide, and separating carbon dioxide from hydrogen in said effluent of said water gas shift reaction zone at substantially said water gas shift conversion reaction zone pressure and recovering a hydrogen-rich product therefrom at said reaction zone pressure.

2. A process as claimed in claim 1, wherein the amount of oxygen supplied to said reaction zone is from 10.4 to 14.4 standard cubic feet of oxygen per pound of hydrocarbon.

3. A process as claimed in claim 1 wherein the relative proportions of steam to hydrocarbons supplied to said reaction zone is within the range of one pound of steam to about one to ten pounds of hydrocarbon.

4. In a process for the production of carbon monoxide and hydrogen by direct partial oxidation of a liquid hydrocarbon with oxygen wherein steam is supplied to the reaction zone in relative proportions within the range of one pound of steam to from about 1 to about 4 pounds of hydrocarbon and said reaction is carried out in a compact reaction zone free from packing and catalyst autogenously maintained at a temperature above 2000° F., the improvement which comprises introducing said liquid hydrocarbon intimately admixed with oxygen and steam into said reaction zone, maintaining a pressure above 1000 p.s.i.g. and autogenously maintaining a temperature in the range of 2200 to 3000° F. in said reaction zone by supplying oxygen to said reaction zone in an amount within the range of 1.6 to 1.9 mols of oxygen per million B.t.u.'s gross heating value of said hydrocarbon liquid, introducing the reactants at sufficient rate to generate a mixture of carbon monoxide and hydrogen at a rate in excess of 15,000 standard cubic feet of mixture per hour per cubic foot of volume of said compact reaction zone, discharging effluent gas containing carbon monoxide and hydrogen at said reaction zone temperatures from said reaction zone into a gas-liquid contacting zone into direct contact at substantially reaction zone pressure with water preheated to substantially equilibrium temperature of said gas-liquid contacting zone and supplied thereto in an amount in excess of the amount vaporizable by the heat contained in said effluent gas, and passing resulting carbon monoxide and hydrogen mixture containing added water vapor resulting from vaporization of water by said effluent gas at the temperature and pressure of said gas-water contacting step directly into contact with water gas shift reaction catalyst effecting conversion of carbon monoxide to carbon dioxide at substantially said reaction zone pressure.

5. A process according to claim 4 wherein all pressures are within the range of 1500 to 3000 p.s.i.g.

References Cited

UNITED STATES PATENTS

| | | | |
|---|---|---|---|
| 1,809,978 | 6/1931 | Larson | 23—213 |
| 1,904,908 | 4/1933 | Voorhees | 23—213 |
| 2,793,938 | 5/1957 | Frank. | |
| 2,809,104 | 10/1957 | Strasser et al. | 48—215 |
| 2,829,113 | 4/1958 | Barry et al. | |
| 3,232,727 | 2/1966 | Guptill, Jr., et al. | 48—215 |

JOSEPH SCOVRONEK, Primary Examiner

U.S. Cl. X.R.

48—215; 252—373